F. T. ROBERTS.
VALVE BALL.
APPLICATION FILED APR. 29, 1915.

1,231,530. Patented June 26, 1917.

INVENTOR
Fred Thomas Roberts,
By Albert H. Bates,
ATTY

UNITED STATES PATENT OFFICE.

FRED THOMAS ROBERTS, OF CLEVELAND, OHIO, ASSIGNOR TO THE PARAMOUNT RUBBER COMPANY, OF CLEVELAND, OHIO, A CORPORATION OF OHIO.

VALVE-BALL.

1,231,530.    Specification of Letters Patent.    Patented June 26, 1917.

Application filed April 29, 1915. Serial No. 24,645.

*To all whom it may concern:*

Be it known that I, FRED THOMAS ROBERTS, a citizen of the United States, residing at Cleveland, in the county of Cuyahoga and State of Ohio, have invented a certain new and useful Improvement in Valve-Balls, of which the following is a full, clear, and exact description, reference being had to the accompanying drawings.

In flush tanks and similar uses it has been customary to employ hollow rubber balls as the valve or outlet plug, such balls seating over and within a round orifice and being adapted to be drawn up to release the water. It has been found that the suction in the discharge pipe, as the ball seats, tends to draw the ball into such pipe with considerable force, resulting in an elongation of the ball and a certain amount of collapsing in its upper portion. This collapsing distorts and otherwise weakens the ball, and this gradually increases as the ball wears, until the ball does not seat accurately and finally becomes worthless for its intended purpose.

I have found that the life of the ball may be very materially increased and its accuracy of seating maintained, by reinforcing it in such a way as to prevent the collapsing and elongating referred to. The reinforce I provide is adjacent to the horizontal diameter of the ball, whereby material inward bending is prevented at the zone where the ball seats. I prefer to provide the reinforce in the upper half of the ball in the form of radial rubber webs. Such webs, while not materially increasing the weight or expense of the ball, accomplish the result desired. While, however, I consider the radial rubber webs the preferred form of reinforce, I do not wish to limit my invention specifically thereto. My invention is hereinafter more fully explained and its essential characteristics are summarized in the claims.

Figure 1:
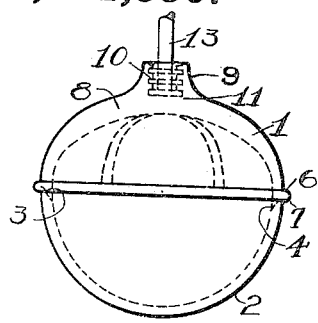
Figure 2:
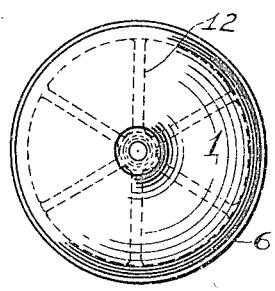
Figure 3:
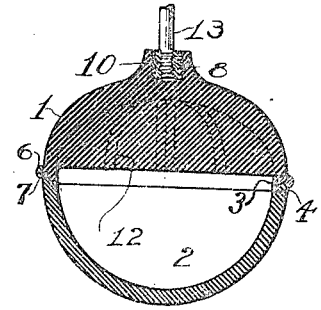
Figure 4:
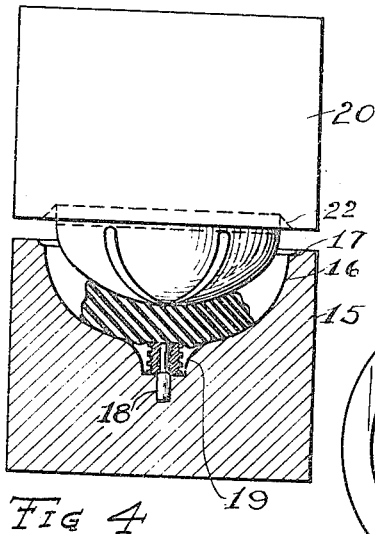
Figure 6:
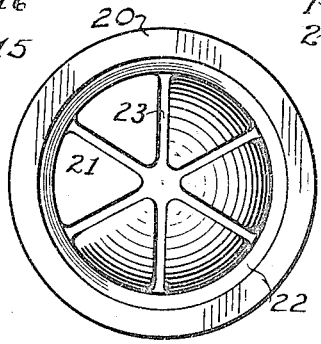
Figure 7:
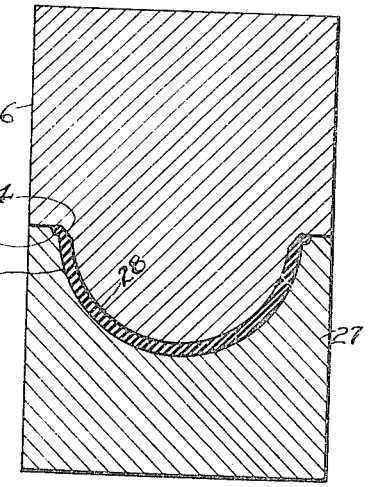
Figure 5:
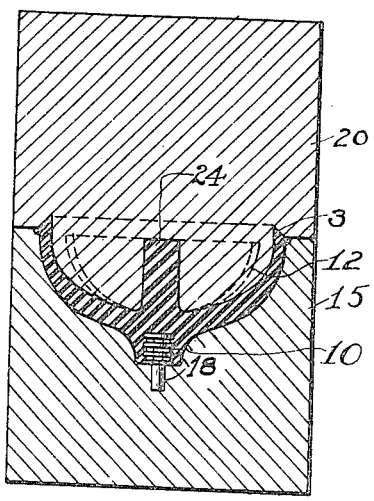
Figure 8:
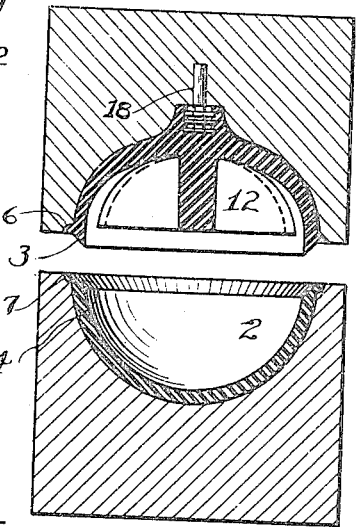

In the drawings, Figure 1 is a side elevation of a preferred form of my ball; Fig. 2 is a plan thereof; Fig. 3 is a vertical central section, the remaining figures illustrating dies for making the ball shown in Figs. 1 to 3. Fig. 4 is a vertical section of the two dies for making the upper half of the ball, in position just as they are beginning to act on a block of rubber; Fig. 5 is a similar view showing these dies at the end of their stroke; Fig. 6 is a bottom plan of the upper die shown in Figs. 4 and 5; Fig. 7 is a vertical section of a pair of dies for forming the lower half of the ball, the view showing these dies in their final position; Fig. 8 is a vertical section through a pair of dies adapted to bring the two parts of the ball together.

Referring to the drawings by reference numerals, 1 indicates the upper portion of the ball and 2 the substantially hemispherical lower portion, these portions preferably having overlapping beveled edges 3 and 4 respectively. If desired, a horizontal annular rib may be formed on the outside of the ball, such rib, for example, comprising two quarter round beads 6 and 7, extending outwardly from the meeting point of the outer part of the beveled edges, these quarter round beads having substantially flat contiguous surfaces which with the beveled edges are fitted together and then vulcanized. The upper shell is substantially in the form of a hemisphere slightly flattened and made thicker at its upper portion, as shown at 8, and carrying an upwardly projecting boss 9, in which is embedded a centrally positioned internally threaded collar 10. This collar is provided wth a series of corrugations 11 engaging the rubber and securely holding the same in place when the ball is vulcanized. A rod indicated at 13, is shown threaded into this collar to provide for raising it from its seat to permit the flow of water, as heretofore described.

To stiffen and strengthen the ball and prevent collapsing and elongation thereof, I have provided a plurality of radial webs 12 of the same material as the ball, extending to the central zone thereof and made integral with the upper portion 1 at their edges, while they are integrally joined at their central portion.

As stated, the lower portion of the ball is substantially hemispherical and of substantially the same thickness throughout except for the downwardly extending beveled edge 4, heretofore described, adjacent which is the bead portion 7. The ball normally seats on the upper portion of the lower member 2, and it will be seen that the ribs 12, in addition to the thickened portion 8 will prevent any tendency to collapse adjacent the zone where the ball seats.

I prefer to make the ball by forming the two parts in dies, shown in Figs. 4 to 8 inclusive, in a manner which will now be described. The lower die 15 (Figs. 4 and 5), is provided with a cavity 16, shaped to form the exterior of the upper portion of the ball, and which may have an annular recess 17 adapted to form the bead 6. Extending upwardly from the center of the depression 19, adapted to form the boss 9, is a pin 18, securely held in the die member and adapted to engage and position the threaded collar 10, while the rubber flows around the collar, and the pin allows the collar to be withdrawn freely with this portion of the ball. The upper die 20 is shown as having a depending dome-shaped projection 21, surrounded by an annular gutter 22 adapted to form the beveled edge 3. The dome 21 is slotted radially, as indicated at 23, leaving spaces which are filled with rubber forming the webs 12. Fig. 5 is a section taken on a plane cutting between two pairs of the radial webs 12 and showing these dies 15 and 20 brought together to form the finished upper portion 1 of the ball. This figure shows at 24 the portion where the webs join at the center and shows the rubber forced around the collar 10, as described. The lower portion of the ball is formed by dies 26 and 27, the die 26 having substantially hemispherical downwardly projecting portion 28' at the base of which is a frusto conical surface 28, forming the beveled edge 4; the die 27 is provided with a complementary hemispherical cavity and may have an annular recess, forming the bead portion 7. This figure shows the dies after they have been brought together on a piece of rubber, forcing the same into the finished form.

After completing the lower and upper portions the die member 20 is removed from its companion, free from the finished upper portion of the ball, and the die member 26 is removed from its companion free from the finished lower portion and the finished shells 1 and 2 may be brought together in the die members 15 and 27 or may be removed and placed in similar die members which are brought together in the relative positions shown in Fig. 8, or inverted if desired. This brings the edges together, in which position the ball may be vulcanized, thereby permanently securing the two halves to each other and forming the completed ball which may be then removed from the dies.

Having thus described my invention, what I claim is:

1. A hollow valve ball having a reinforcing device in the upper portion of the ball consisting of a series of webs lying in vertical radial planes and extending from a central vertical core to the wall of the ball, the upper edges of the webs being connected with such wall.

2. A hollow ball of the character described, comprising a hollow lower substantially hemispherical section, and an upper section, these sections having edges meeting and secured together, there being provided in the upper section a plurality of radially extending vertical webs integral with the wall of the upper section, edges of the webs joining such wall at equally spaced points.

3. A hollow elastic valve ball comprising a lower flexible portion and an upper portion stiffened by reinforcing webs made of the material of the ball.

4. A hollow rubber valve ball comprising a lower flexible portion and an upper portion stiffened by rubber reinforcing webs extending across it.

5. A hollow valve ball having a lower flexible portion and an upper portion stiffened by vertical webs the edges of which engage the inner face of the upper portion and which depend for a considerable distance into the interior of the ball.

6. A hollow rubber valve ball consisting of two shells joined together at their edges, the lower shell being comparatively flexible and the upper shall being provided with internal vertical stiffening webs of rubber, the upper edges of which join with the inner face of the upper shell.

7. A hollow rubber valve ball comprising approximately hemispherical upper and lower sections, said lower section being flexible and said upper section being stiffened by radial rubber webs joining the wall thereof at equally spaced points.

8. A hollow valve ball consisting of two shells joined together at their edges, the upper shell being provided with stiffening webs comprising plate-like portions extending across the space in the interior of the shell and lying in vertical radial planes.

9. A hollow valve ball having a plurality of webs formed of the material of the ball and joined thereto at edges of the webs at equally spaced points on the inside of the wall of the ball extending transversely of the ball across its interior and intermediately out of contact with the wall of the ball.

10. A tank ball of the class described, comprising a one-piece spherical member of varying thickness, and radially disposed integral ribs formed on the interior thereof extending downwardly from the central upper portion of the member to near the middle thereof.

In testimony whereof, I hereunto affix my signature.

FRED THOMAS ROBERTS.